United States Patent
Hahn

(10) Patent No.: US 7,378,138 B1
(45) Date of Patent: May 27, 2008

(54) MULTILAYER DEVICE FOR STORING AND TRANSPORTING CHEMICALS

(75) Inventor: Hans-Ulrich Hahn, Neustadt (DE)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/276,165

(22) PCT Filed: Feb. 1, 2000

(86) PCT No.: PCT/EP00/00777

§ 371 (c)(1),
(2), (4) Date: May 9, 2003

(87) PCT Pub. No.: WO00/47412

PCT Pub. Date: Aug. 17, 2000

(30) Foreign Application Priority Data

Feb. 11, 1999 (DE) ................ 199 05 765

(51) Int. Cl.
*B32B 1/08* (2006.01)
*B32B 27/08* (2006.01)

(52) U.S. Cl. ............. 428/35.7; 428/515; 428/516

(58) Field of Classification Search ........ 428/516, 428/26.91, 35.7, 35.8; 52/484; 264/524
See application file for complete search history.

(56) References Cited

U.S. PATENT DOCUMENTS 5,985,388 A * 11/1999 Tomita et al. .......... 428/35.2

FOREIGN PATENT DOCUMENTS

| DE | 43 10 641 | | 1/1994 |
|---|---|---|---|
| DE | 196 28 643 | | 1/1998 |
| EP | 0 673 841 | | 9/1995 |
| EP | 0 741 080 | | 11/1996 |
| JP | 62039444 | * | 2/1987 |
| JP | 1208115 | | 8/1989 |
| WO | WO 95/27754 | | 10/1995 |
| WO | WO 00/47412 | | 8/2000 |

* cited by examiner

*Primary Examiner*—Sheeba Ahmed
(74) *Attorney, Agent, or Firm*—Erika S. Wilson

(57) ABSTRACT

The invention relates to a multilayer device for storing and transporting chemicals, especially highly pure, liquid chemicals for the electronics industry. The device is produced from a thermoplastic by co-extrusion. The innermost layer of the device on the contents side is produced form a stabilizer-free HDPE. The invention relates to a method for producing a multilayer device for storing and trans-porting chemicals, especially highly pure, liquid chemicals for the electronics industry, using a multilayer blow extruder with at least one inner extruder and at least one outer extruder. The method has at least the following steps: a) charging the outer extruder with an extrudable polymer or copolymer and the inner extruder with a stabilizer-free HD-PE; b) plasticizing the polymer or copolymer in the outer extruder and the stabilizer-free HD-PE in the inner extruder; c) co-extruding the plasticized polymer or copolymer in the outer extruder and the stabilizer-free HD-PE in the inner extruder into a forming device; d) forming the device for storing and transporting chemicals in the forming device.

2 Claims, 1 Drawing Sheet

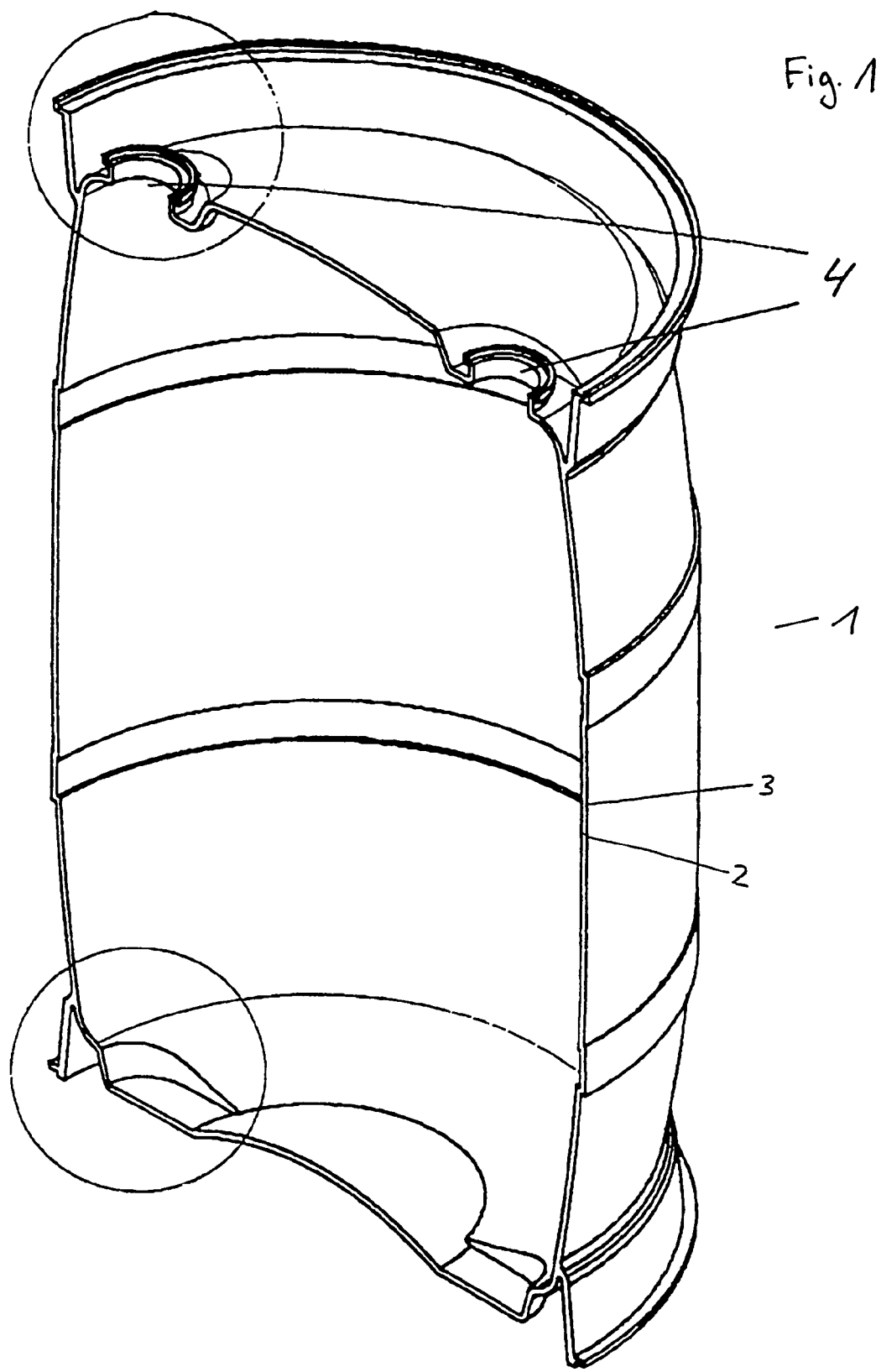

MULTILAYER DEVICE FOR STORING AND TRANSPORTING CHEMICALS

The invention relates to a multilayer device for storing and transporting chemicals, in particular highly pure, liquid chemicals for the electronics industry.

When producing electronic components, liquid chemicals are often required; high standards are demanded for their purity. In particular with the production of large-scale integration microchips, a high degree of purity is required. Generally, the requirements to purity of liquid special chemicals, i.e. of process chemicals for electronics industry, have drastically increased over the past years. It is no longer sufficient to produce the chemicals with the required purity, but it also has to be ensured that the product is not polluted during transporting, storing, and handling. Moreover, storing and transporting security have to be guaranteed since some of these chemicals may be aggressive or even toxic. Unintentional outflow, e.g. due to damage on the transporting container or due to leakage, has to be excluded with the highest possible degree of security.

Thus, two aspects have to be taken into account when choosing material for such containers. For one point, the choice should be directed at excluding any pollution by the wall material of the container, getting into contact with the chemicals to be transported or stored. Besides avoiding contamination of the chemicals to be transported and maceration endurance by the chemicals to be transported, the container has to additionally have sufficient stiffness as well as certain degree of elasticity so that the container is not sensitive to pressure and impact and is stabile, and neither has affinity to deformation nor to cracking. Moreover, it is desirable that the capacity of the container is relatively big and that its production is quick and simple.

It is known from DE 196 28 643 that certain polyethylenes, in particular stabilizer-free HDPE, are particularly well suitable for production of storing and trans-porting containers for liquid, highly pure chemicals for the electronics industry. In particular, HD polyethylenes are mentioned with a specific density of 0.940-0.970 g/cm$^3$, in particular 0.942-0.961 g/cm$^3$. In particular polyethylenes distributed under the trademark Lupolen rank among them. To be mentioned are Lupolen® 6021D, Lupolen® 5021D, Lupolen® 4261AQ149, and Lupolen® 4261AQ135. According to this prior art, corresponding devices were produced by welding of plates consisting of this material. The production of such containers was time and money consuming due to the welding of corresponding extruded plates. Moreover, due to the welding and the welding seams created in the process, the quality-maintaining characteristics of Lupolen® 6021D could not be guaranteed satisfyingly. On the other hand, it has up until now not been possible to produce monolayer blow extruded transporting containers with a volume of e.g. 200 liter by blowing, or the thus-produced containers did not comply with the mechanical requirements of examination of dangerous-medium packaging.

One problem to be solved by the present invention is to provide a device for storing and transporting chemicals, in particular highly pure, liquid chemicals for electronics industry, and to provide a corresponding method for producing a device according to the invention which complies with the above-mentioned requirements, and makes simple and quick manufacturing possible.

According to the invention, a multilayer device produced by co-extrusion and consisting of thermoplastic plastics is provided for storing and transporting chemicals, in particular liquid, highly pure chemicals for electronics industry wherein the most innermost layer of the device on the contents side is made of stabilizer-free HDPE (high density polyethylene). Within this invention, stabilizer-free HDPE is meant to be HDPE produced without any use of the generally common stabilizers. Generally common stabilizers are in particular antioxidants known to the person skilled in the art (cf. e.g. "Kunststoffe" 78(2), 142 (1988)).

The stabilizer-free HDPE is preferably a polyethylene with a specific density in the range from 0.940 to 0.970 g/cm$^3$, in particular from 0.942 to 0.961 g/cm$^3$, particularly preferred from 0.946 to 0.960 g/cm$^3$ which is releasing particularly low amounts of particles as pollutants in contact with highly pure, liquid chemicals.

In another particularly preferred embodiment, the stabilizer-free HDPE is a polyethylene with a specific density in the range of 0.940 to 0.970 g/cm$^3$, in particular from 0.942 to 0.961 g/cm$^3$, particularly preferred from 0.946 to 0.960 g/cm$^3$ which is releasing one of the following ionic impurities in contact with basic, neutral, and acidic, highly-pure chemicals:

$Al \leq 60$ ng/g, $Ca \leq 60$ ng/g, $Fe \leq 63$ ng/g, $Mg \leq 16$ ng/g, $Ti \leq 4$ ng/g, $Zn \leq 6$ ng/g, $Mn \leq 0.3$ ng/g, $Cu \leq 1.5$ ng/g.

The stabilizer-free HDPEs are further characterized by a low degree of remainders of catalysts which results in that these materials release particularly low amounts of ionic impurities in contact with basic as well as acid, highly pure chemicals. Moreover, comparatively low amounts of particles are created by interactions between the chemicals to be stored or transported and the material. The content of particles is preferably as follows:

particles with a size $\leq 0.51$ μm: content $\leq 5$/ml liquid, particles with a size $\leq 0.21$ μm: content $\leq 50$/ml liquid, particles with a size $\leq 0.1$ μm: content $\leq 500$/ml liquid.

The HDPE which is sold under the trademark Lupolen® 6021 D or the HDPE which is sold under the trademark Lupolen® 4261AQ149 is particularly preferably used. The purity for highly pure chemicals is given with this material. The material, moreover, is well extrudable.

In order to solve this problem according to the invention, the method of multilayer blow extrusion or co-extrusion is chosen for production of a device for storing or transporting a highly pure chemical. Therein, as per the invention, the mechanically weak, highly pure layer of stabilizer-free HDPE is used on the contents side whilst the material used for the outer layer can be chosen freely, is known and extrudable. The method of multilayer blow extrusion allows for production of the device as per the invention in a continuous work process. Thus, considerable cost and time expense can be saved in comparison to the welding process used until now. Moreover, the device as per the invention is by far more resistant to pressure and falling than known containers since it is integrally made, and has no welding seams or similar weak points. In co-extrusion, a number of layers of molten polymers are put one on top of the other and connected in the extrusion die. Such multilayer dies have various melting inputs and a common output channel.

If different materials are used for the innermost layer and the other layers, a bonding agent layer is extruded between the respective layers so that a mechanically stabile and permanent connection between the layers is created, and the device is stabile against pressure, impact, and other outermost mechanical influences. Generally, polymers are thermodynamically incompatible. The device as per the invention has, preferably, 2 to 5 layers. Therein, the individual layers contain the following materials, mentioned from the innermost part to the outside: HDPE—bonding agent—polyamide or EVOH—bonding agent—arbitrary, extrudable PE. Preferably, the innermost layer adds 10% to 20% to the wall thickness of the device, the outermost layer 50% to 80%, and the three medium layers a total of 10% to 30%.

Preferably, at least another layer of the device, preferably the outermost layer, is made of an extrudable polymer or copolymer, preferably of a HDPE with a specific density in a range of 0.940 to 0.970 g/cm$^3$, in particular from 0.942 to 0.961 g/cm$^3$, particularly preferably from 0.946 to 0.960 g/cm$^3$.

In a preferred embodiment, the outermost layer comprises at least a HDPE from the group Lupolen® 5261, Lupolen® 4261AQ135, Hostalen®GM6255, Fina® 56020, Borealis® 8214, Stamylan® 7731, and 7890, Daplen® AH5493, or a mixture of two or more of this group's HDPE.

In another preferred embodiment, the outermost layer comprises pigments, protecting the layer against UV light. Thus, in particular in transporting, the device is protected against any damage caused by incident light. The layer maintains its mechanically stabile characteristics. Preferably the used pigment is carbon black, but also quartz, common master batches and other common pigments, like e.g. Cu-phthalocynanine or TiO$_2$, as well as organic UV stabilizers, and biphenyl compounds can be used.

In another preferred embodiment, the outermost layer is electrically conductive. Therein the creation of flying sparks is avoided since each loading occurring on the surface can be removed. Thus, in general, no electrostatic loading of the device's surface can occur in comparison to its surroundings. The main danger of the electrostatic loading is caused by the coincidence of explodable (inflammable) mixtures, among which the chemicals to be transported in the device can rank. Electric loading can occur due to mechanical separation, e.g. by rubbing or pouring of liquids or by electrostatic induction. The material of the outermost layer is preferably chosen in such a way as to set the specific electric surface resistance to $\leq 10^5 \Omega$. The surface is therefore permanently anti-static which is why the device as per the invention can also be used in areas with explosion danger. Preferably, the used material is HDPE which is sold under the trademark Hostalen® GM 9350 C black.

In another preferred embodiment of the present invention, the outermost layer is enforced in order to increase the stiffness against pressure, falling or impact e.g. by means of glass fibers or by addition of further mechanically stabile materials such as e.g. polymers. Preferably, polyamide plates are worked into the outermost layer for enabling enforcement. E.g. PE composites such as Selar can be incorporated.

In another particularly preferred embodiment, the device is bi-layered. The innermost layer, preferably made of Lupolen® 6021 D or of Lupolen® 4261AQ149 adds 20% to 40% to the wall thickness while the outermost layer adds 60% to 80%. This configuration has proven to be particularly stabile.

In another preferred embodiment of the invention, the device has at least three layers wherein the medium layer is made of waste from the production. These are so-called slug waste; they are those parts that fall off when "forming" the device at the upper and lower end.

Preferably, the device as per the invention has at least one opening, preferably tow openings. An opening diameter of $\leq 70$ mm is particularly preferred. The openings serve for retaining submerged tubes or plugs. They are preferably made from one or more of the following materials: HDPE, perfluoro-alkoxy polymer (PFA), polypropylene, PVdF and perfluorinated polyethylene-propylene (FEP).

Another preferred embodiment of the device as per the invention has a capacity of $\geq 5$ liter, particularly preferred a capacity of $\geq 200$ liter. By producing the device by means of multilayer blow extrusion it is possible to produce a device for trans-porting and storing of highly pure chemicals simply, and quickly, and within only one work step, which device complies with security requirements. This means considerable cost and time savings.

Furthermore, the invention relates to a method for producing a multilayered device for storing and transporting of chemicals, in particular liquid, highly pure chemicals for the electronics industry by means of a multilayer blow extruder with at least one inner extruder and one outer extruder, wherein the method comprises the following steps:

a) charging the outer extruder with an extrudable polymer or copolymer and the inner extruder with a stabilizer-free HD-PE;

b) plasticizing the polymer or copolymer in the outer extruder and the stabilizer-free HD-PE in the inner extruder;

c) co-extruding the plasticized polymer or copolymer in the outer extruder and the stabilizer-free HD-PE in the inner extruder into a forming device;

d) forming the device for storing and transporting chemicals in the forming device.

The extrusion is preferably performed with inert gas superposition in order to avoid every possible contact with oxygen. Nitrogen is preferably used as inert gas. If Lupolen® 6021 D is used, however, no inert gas superposition is necessary. The work temperature is higher than the melting point of the materials to be extruded. Preferably it is set to 180 to 230° C.

In another preferred embodiment of the method as per the invention, the extrudable polymer or copolymer in the outer extruder is one of the polymers already mentioned in connection with the outermost layer and the stabilizer-free HDPE in the inner extruder is preferably one of the HDPEs already mentioned in connection with the innermost layer.

By means of the method as per the invention, it is possible to produce a multilayered device as per the invention quickly and easily. Only one continuous work process is required in order to form the complete container. Subsequent welding of previously manufactured plates are no longer necessary and thus of course also the occurrence of welding seams on the finished device, respectively. By directly connecting the different layers during manufacturing, a special degree of stability and contact between the individual layers is created.

Moreover, the invention relates to using the device as per the present invention for storing and/or transporting of an ammonia solution, in particular a solution of 20-30% ammonia.

Further advantages, features, and possibilities of use of the present invention are shown in the following description of an embodiment in connection with the drawing. Showing are:

FIG. 1 a sectional view of a device as per the invention from thermoplastic plastics for storing and transporting of chemicals, in particular of liquid, highly pure chemicals for electronics industry.

FIG. 1 shows the sectional view of a device 1 as per the present invention for storing and transporting of chemicals, in particular of liquid, highly pure chemicals, for electronics industry. Device 1 is in the form of a cylinder or barrel. It has an innermost layer 2 which is preferably made of Lupolen® 6021 D, and an outermost layer 3, preferably made of HDPE. Preferably, the HDPE of the outermost layer 3 has a specific density in the range from 0.940 to 0.970 g/cm$^3$, preferably from 0.942 to 0.961 g/cm$^3$, more preferably from 0.942 to 0.960 g/cm$^3$. The device as per the present invention has two openings 4 provided at its top. These openings are for retaining submerging tubes or plugs. The openings' diameter is preferably $\leq 70$ mm. Round recesses are preferably provided on the bottom of the device for retaining the submerging tubes. Good remainder emptying is achieved by means of these submerging tubes. The outermost layer preferably comprises a pigment for protection of the inner layers against UV light. Moreover, the outer most layers is particularly preferably electrically conductive. The device's wall thickness is preferably comparatively thick in order to achieve optimal pressure resistance of the device as per the present invention. This cannot be renounced for safe storing and transporting of the corresponding chemicals. With a capacity of about 12 kg, a wall thickness of 5 mm is preferably chosen, a wall thickness of 6 mm correspondingly with a capacity of approx. 14 kg. In a bi-layered container, the innermost layer adds about 20% to 40% to wall thickness and the outermost layer correspondingly 60% to 80%.

The invention claimed is:

1. A method of using a device for containing chemicals, said device comprising multiple layers of co-extruded thermoplastic, including an inner most layer comprising stabilizer-free HDPE, and at least one more layer comprising an HDPE having a stabilizer, said method comprising the steps of:

disposing a high purity ammonia solution in said device such that it contacts said innermost layer; and transporting said device with said ammonia solution in it to a different location.

2. The method of claim 1, wherein the stabilizer-free HDPE releases ionic impurities into the ammonia solution in compliance with the following limits:

$Al \leq 60$ ng/g, $Ca \leq 60$ ng/g, $Fe \leq 63$ ng/g, $Mg \leq 16$ ng/g, $Ti \leq 4$ ng/g, $Zn \leq 6$ ng/g, $Mn \leq 0.3$ ng/g, and $Cu \leq 1.5$ ng/g.

* * * * *